(No Model.)
J. HOOD & S. H. REYNOLDS.
Shears for Cutting Gold Foil.
No. 237,110. Patented Feb. 1, 1881.
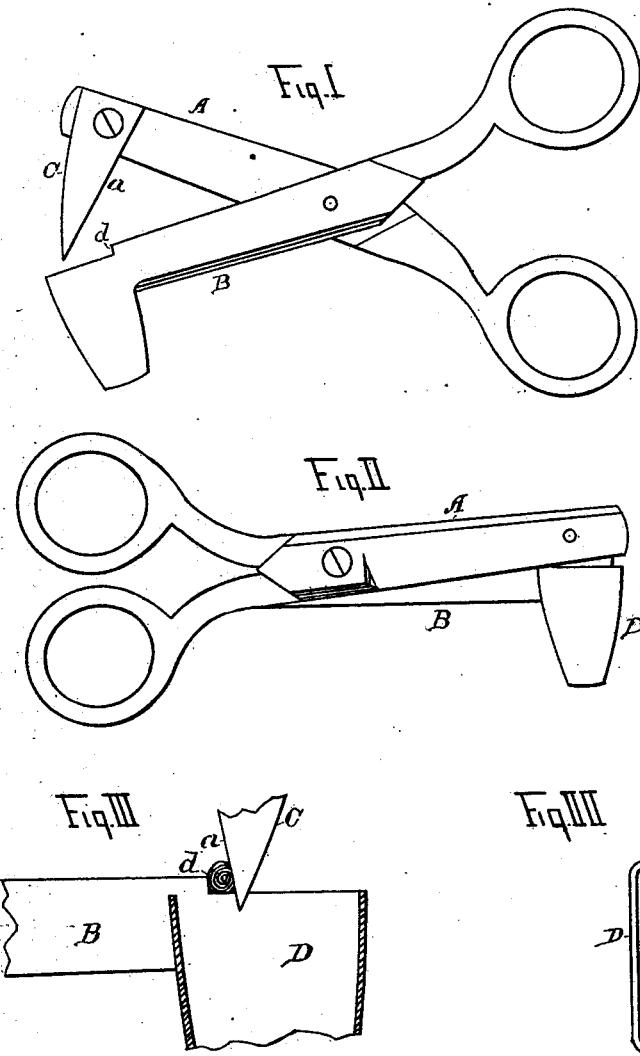

UNITED STATES PATENT OFFICE.

JOHN HOOD AND STEPHEN H. REYNOLDS, OF HYDE PARK, MASS.

SHEARS FOR CUTTING GOLD-FOIL.

SPECIFICATION forming part of Letters Patent No. 237,110, dated February 1, 1881.

Application filed October 5, 1880. (No model.)

*To all whom it may concern:*

Be it known that we, JOHN HOOD and STEPHEN H. REYNOLDS, of Hyde Park, in the county of Norfolk and State of Massachusetts, have invented certain new and useful Improvements in Shears for Cutting Foil; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in the shears employed by dentists for cutting the rolls of gold or other foil used in plugging teeth into suitable lengths. It has been found that the shears commonly used for that purpose condense and harden the foil at each side of the cut. This is objectionable, and to avoid this result we have invented the shears which will be hereinafter fully described.

In the accompanying drawings, Figure I is a side view of the shears open, showing the position of the cutting-blade with relation to the foil when the cut begins. Fig. II is a side view of the shears closed, the several parts being in the position they occupy at the end of the cut. Figs. III and IV are enlarged detail views of the cutting parts.

This cutting implement is formed of two blades, A B, pivoted together by a suitable screw or rivet and provided with bows, in the same manner as the shears or scissors in ordinary use. To fit these blades for the special purpose to which they are to be applied, the part A has secured to its outer end by suitable screws or rivets the triangular cutting knife or blade C, the cutting-edge $a$ of which blade faces the bows and acts upon the foil when the cutter is passing down into the pocket D of the blade B, which is provided with flat supporting-surfaces $b\ b$ upon opposite sides of the slit $c$, through which the knife C enters the pocket, while a shoulder, $d$, forms an abutment against which the foil rests, and is prevented from receding or sliding away from the cutting-knife as it passes downward through the slit.

The pocket D is formed of a loop of metal secured to the blade B at both ends, or it may be an integral part of the blade, forged or otherwise formed thereon. It serves to form a support for the foil upon the sides of the slit $c$, and is also a shield, covering and protecting the triangular cutting-knife from injury.

It will be observed that that portion of the blades A and B between their pivoting-point and the special devices upon their extremities employed for cutting foil may be sharpened and act in the same manner as the blades of ordinary shears, thus rendering the implement useful for many purposes.

The action of the cutting-knife is such that the foil is not compressed, as when cut in the ordinary manner. The support upon both sides of the point at which it is severed and that of the shoulder $d$ in the rear, together with the thinness of the cutting-blade C, render it impossible to condense the foil to any serious extent in the act of cutting. It therefore retains its loose and spongy texture until inserted in the cavity of the tooth.

We are aware that triangular cutters attached to one of the blades of a pair of shears and entering a case or pocket formed upon the opposite blade of the pair when closed have been used for the purpose of cutting button-holes. We do not, therefore, claim such devices as forming part of our invention, it being necessary to add the shoulder or abutment $d$ to the blade B before the roll of foil can be severed by the cutter, as without this support the roll would slide along the blade under the action of the cutter.

Having thus described our invention, we claim as new, and desire to secure by Letters Patent, the following:

As an improvement in shears for cutting foil, the blade B, provided with a pocket, D, and shoulder $d$, by which the roll of foil is supported against the action of the cutter, in combination with the blade A and cutter C, all arranged and operating in the manner shown and described.

In testimony that we claim the foregoing we have hereunto set our hands this 20th day of September, 1880.

JOHN HOOD.
STEPHEN H. REYNOLDS.

Witnesses:
ELISHA BASSETT,
JOHN G. STETSON.